United States Patent
Tanaka

(10) Patent No.: US 8,115,964 B2
(45) Date of Patent: Feb. 14, 2012

(54) IMAGE PROCESSING METHOD FOR PRINTING GRAY OBJECTS

(75) Inventor: Hideo Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1026 days.

(21) Appl. No.: 12/063,584

(22) PCT Filed: Jun. 20, 2007

(86) PCT No.: PCT/JP2007/062840
§ 371 (c)(1),
(2), (4) Date: Feb. 12, 2008

(87) PCT Pub. No.: WO2008/001788
PCT Pub. Date: Jan. 3, 2008

(65) Prior Publication Data
US 2009/0231601 A1    Sep. 17, 2009

(30) Foreign Application Priority Data

Jun. 28, 2006 (JP) ................................ 2006-178291
Jun. 1, 2007 (JP) ................................ 2007-147354

(51) Int. Cl.
*G06K 15/10* (2006.01)
*G06F 3/12* (2006.01)

(52) U.S. Cl. ............ 358/1.8; 358/1.1; 358/1.9; 358/535

(58) Field of Classification Search ................. 358/1.1, 358/1.8, 1.9, 3.01, 3.06, 3.13, 3.16, 535, 358/536
See application file for complete search history.

(56) References Cited

U.S. PATENT DOCUMENTS

| | | |
|---|---|---|
| 5,057,852 A | 10/1991 | Formica et al. |
| 6,367,912 B1 | 4/2002 | Kishimoto et al. |
| 2001/0015734 A1 | 8/2001 | Kanda et al. |
| 2003/0081061 A1 | 5/2003 | Gunther et al. |
| 2009/0051734 A1 | 2/2009 | Ike et al. |

FOREIGN PATENT DOCUMENTS

| | | |
|---|---|---|
| JP | 2 26753 | 1/1990 |
| JP | 7 25014 | 1/1995 |
| JP | 9 290519 | 11/1997 |
| JP | 9 327936 | 12/1997 |

(Continued)

OTHER PUBLICATIONS

Extended Search Report issued Aug. 9, 2011 in Europe Application No. 07767644.3.
Japanese Office Action mailed Dec. 6, 2011, issued for JP Application No. 2007-147354 filed on Jun. 1, 2007.

*Primary Examiner* — Thomas D Lee
(74) *Attorney, Agent, or Firm* — Oblon, Spivak, McClelland, Maier & Neustadt, L.L.P.

(57) ABSTRACT

An image processing apparatus is disclosed that includes an image processing part configured to perform image processing for causing a printer to print document data, the printer having a nozzle head having a first nozzle group and a second nozzle group, the first nozzle group having multiple K nozzles and multiple nozzles whose positions coincide with positions of the K nozzles in a sub scanning direction, the second nozzle group having multiple nozzles offset in the sub scanning direction from the K nozzles. The image processing part is configured to perform the image processing so that K is prevented from being applied to and one or more colors related to the second nozzle group are applied to multiple dots corresponding to the second nozzle group in a single movement of the nozzle head in a main scanning direction with respect to a gray drawing object contained in the document data.

7 Claims, 10 Drawing Sheets

FOREIGN PATENT DOCUMENTS

| | | |
|---|---|---|
| JP | 10 217488 | 8/1998 |
| JP | 10-264372 | 10/1998 |
| JP | 2001 260423 | 9/2001 |
| JP | 2003 25614 | 1/2003 |
| JP | 2003 62986 | 3/2003 |
| JP | 2005 324559 | 11/2005 |
| JP | 2007 30198 | 2/2007 |
| WO | WO 2007010726 A1 * | 1/2007 |

* cited by examiner

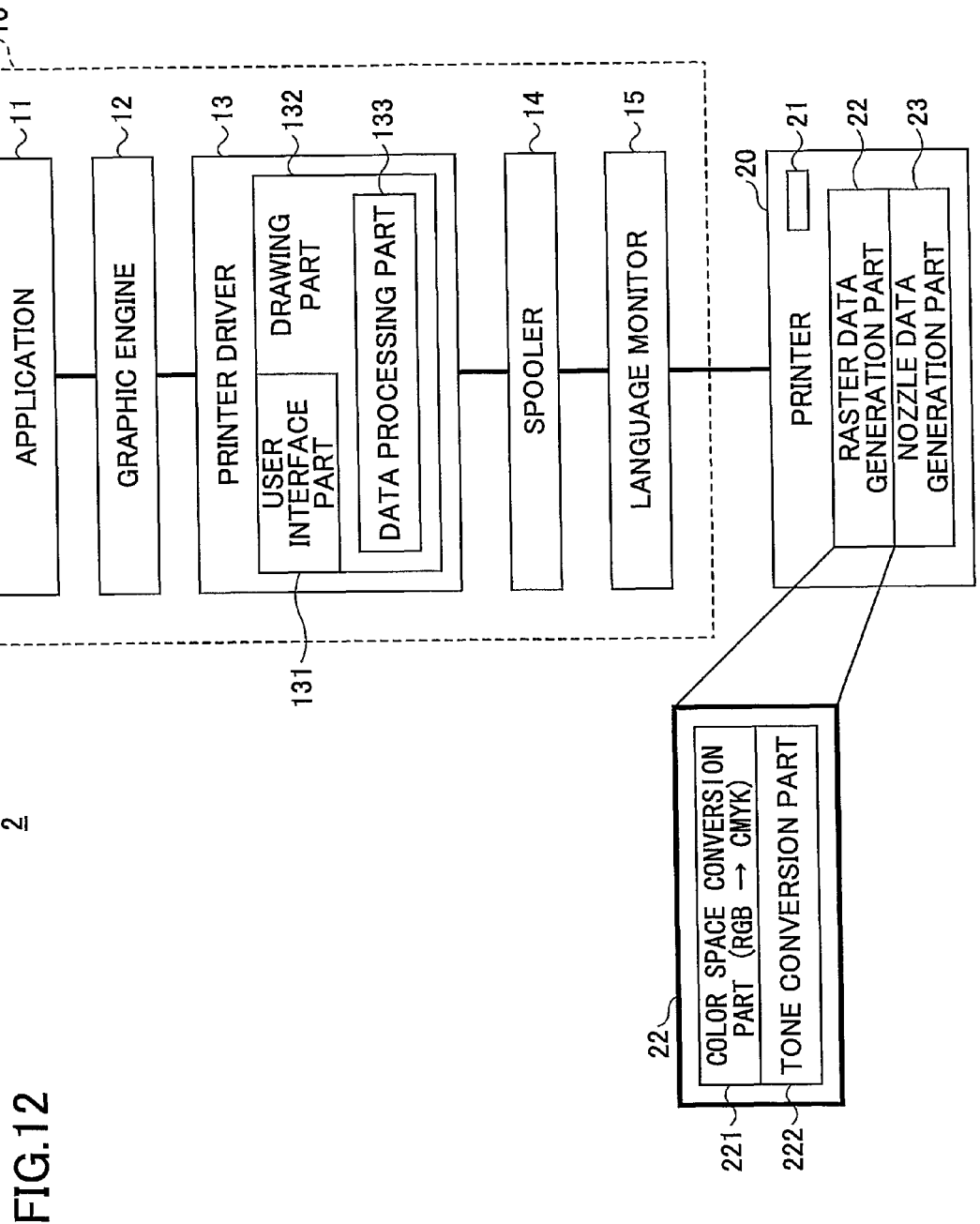

IMAGE PROCESSING METHOD FOR PRINTING GRAY OBJECTS

TECHNICAL FIELD

The present invention relates generally to image processing apparatuses, printers, and image processing methods. The present invention relates more particularly to an image processing apparatus and an image processing method that execute image processing for causing a printer to print document data and to the printer caused to print the document data.

BACKGROUND ART

FIG. 1 is a diagram showing a nozzle arrangement in a nozzle head 500 of an ink-jet printer. Referring to FIG. 1, four nozzle arrays for different ink colors are arranged in order of Y (yellow), M (magenta), K (black), and C (cyan) in the main scanning direction in the nozzle head 500, and the nozzles of each color have a resolution of 150 dpi in the sub scanning direction. In FIG. 1, the Y array and the K array coincide with each other in nozzle position in the sub scanning direction. Further, the nozzles of the M array and the C array are arranged in positions offset in the sub scanning direction from the nozzles of the Y and K arrays. As a result, the nozzles are arranged in a staggered fashion as a whole. It is assumed that printing of 300 dpi is to be performed in a single color of K with this nozzle head 500. A single movement of the nozzle head 500 in the main scanning direction performs printing on printing paper as shown in FIG. 2.

FIG. 2 is a diagram showing an image of printing by a single movement of the nozzle head in the main scanning direction. In FIG. 2, black circles indicate dots at which printing is performed (printed dots), while broken-line white circles indicate virtual dots at which printing is not performed at the 300-dpi resolution (unprinted dots). Thus, a single movement in the main scanning direction leaves a blank part as indicated by the unprinted dots in the case where it is desired to perform printing at a resolution higher than that of nozzles in the sub scanning direction. Accordingly, conventionally, it is necessary to move the nozzle head 500 by one dot in the sub scanning direction and perform printing in the main scanning direction in order to fill (perform printing in) the blank part.

Reference may be made to Japanese Laid-Open Patent Application No. 2005-324559 for such a conventional configuration.

Printed documents are used for various purposes, and high image quality is not necessarily required for some printed documents. In some cases, it is desired to give priority to printing speed at the expense of some image quality. Actually, some printer drivers cause a user to determine which of image quality and printing speed should be given priority, and perform image processing in accordance with the user's determination.

In the above-described case, one may instantaneously come up with the idea of printing at a resolution of 150 dpi as a solution for improving printing speed. This is because reduction in resolution has a remarkable effect over improvement of printing speed. Indeed, in the above-described case, there is no need to print a blank part as unprinted dots in printing at 150 dpi, and simple calculation shows that the number of movements of the nozzle head 500 in the main scanning direction can be reduced by half. However, there is a problem in that reduction in resolution causes significant degradation of image quality. Accordingly, reduction in resolution is not necessarily a desirable solution for a user who wishes to perform high-speed printing on one hand and maintain a certain degree of image quality on the other hand.

DISCLOSURE OF THE INVENTION

Embodiments of the present invention may solve or reduce one or more of the above-described problems.

According to one aspect of the present invention, there are provided an image processing apparatus, a printer, and an image processing method in which one or more of the above-described problems may be solved or reduced.

According to one aspect of the present invention, there are provided an image processing apparatus, a printer, and an image processing method capable of providing a new variation with respect to a balance of image quality and printing speed.

According to one aspect of the present invention, there is also provided a computer-readable recording medium having a program recorded thereon, the program causing a computer to execute the above-described image processing method.

According to one aspect of the present invention, there is provided an image processing apparatus including an image processing part configured to perform image processing for causing a printer to print document data, the printer having a nozzle head, the nozzle head having a first nozzle group and a second nozzle group, the first nozzle group having a plurality of nozzles of K and a plurality of nozzles whose positions coincide with positions of the nozzles of the K in a sub scanning direction, the second nozzle group having a plurality of nozzles offset in the sub scanning direction from the nozzles of the K, wherein the image processing part is configured to perform the image processing so that the K is prevented from being applied to and one or more colors related to the second nozzle group are applied to a plurality of dots corresponding to the second nozzle group in a single movement of the nozzle head in a main scanning direction with respect to a gray drawing object contained in the document data.

According to such an image processing apparatus, it is possible to provide a new variation with respect to the balance of image quality and printing speed.

According to one aspect of the present invention, there is provided a printer including a nozzle head configured to have a first nozzle group and a second nozzle group, the first nozzle group having a plurality of nozzles of K and a plurality of nozzles whose positions coincide with positions of the nozzles of the K in a sub scanning direction, the second nozzle group having a plurality of nozzles offset in the sub scanning direction from the nozzles of the K; and an image processing part configured to perform image processing for causing document data to be printed, wherein the image processing part is configured to perform the image processing so that the K is prevented from being applied to and one or more colors related to the second nozzle group are applied to a plurality of dots corresponding to the second nozzle group in a single movement of the nozzle head in a main scanning direction with respect to a gray drawing object contained in the document data.

According to one aspect of the present invention, there is provided a method of performing image processing for causing a printer to print document data, the printer having a nozzle head, the nozzle head having a first nozzle group and a second nozzle group, the first nozzle group having a plurality of nozzles of K and a plurality of nozzles whose positions coincide with positions of the nozzles of the K in a sub scanning direction, the second nozzle group having a plurality of nozzles offset in the sub scanning direction from the nozzles of the K, the method including the step of performing the image processing so that the K is prevented from being applied to and one or more colors related to the second nozzle group are applied to a plurality of dots corresponding to the second nozzle group in a single movement of the nozzle head in a main scanning direction with respect to a gray drawing object contained in the document data.

According to one aspect of the present invention, there is provided a computer-readable recording medium on which is recorded an image processing program for causing a computer to execute image processing for causing a printer to print document data, the printer having a nozzle head, the nozzle head having a first nozzle group and a second nozzle group, the first nozzle group having a plurality of nozzles of K and a plurality of nozzles whose positions coincide with positions of the nozzles of the K in a sub scanning direction, the second nozzle group having a plurality of nozzles offset in the sub scanning direction from the nozzles of the K, wherein the image processing program includes the step of performing the image processing so that the K is prevented from being applied to and one or more colors related to the second nozzle group are applied to a plurality of dots corresponding to the second nozzle group in a single movement of the nozzle head in a main scanning direction with respect to a gray drawing object contained in the document data.

Thus, according to embodiments of the present invention, it is possible to provide an image processing apparatus, a printer, and an image processing method capable of providing a new variation with respect to the balance of image quality and printing speed, and a computer-readable recording medium on which is recorded an image processing program capable of providing a new variation with respect to the balance of image quality and printing speed.

BRIEF DESCRIPTION OF THE DRAWINGS

Other objects, features and advantages of the present invention will become more apparent from the following detailed description when read in conjunction with the accompanying drawings, in which:

FIG. 12 is a diagram showing a printing system according to a second embodiment of the present invention.

BEST MODE FOR CARRYING OUT THE INVENTION

Figure 1:
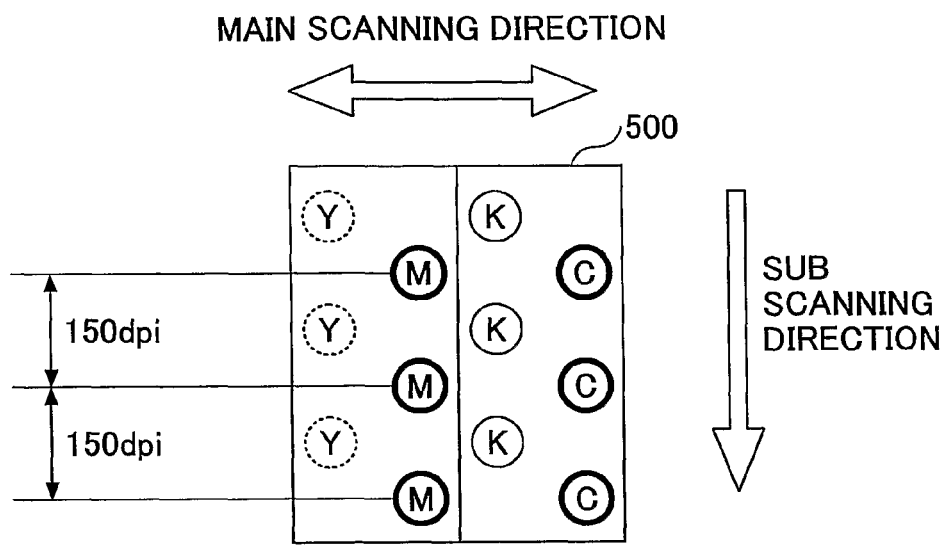
FIG. 1 is a diagram showing a nozzle arrangement in a nozzle head of an ink-jet printer.
Figure 2:
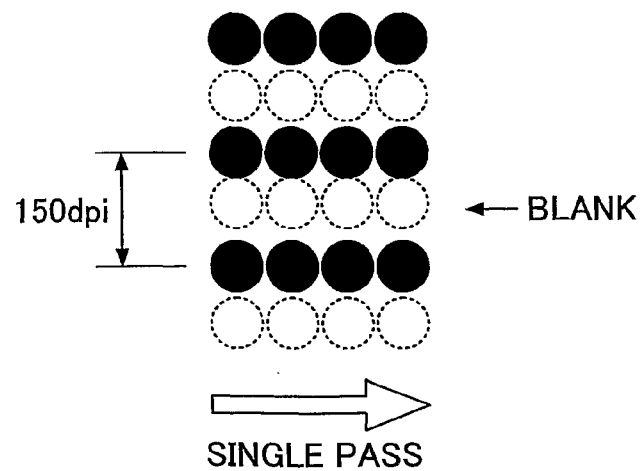
FIG. 2 is a diagram showing an image of printing by a single movement of the nozzle head in the main scanning direction.
Figure 3:
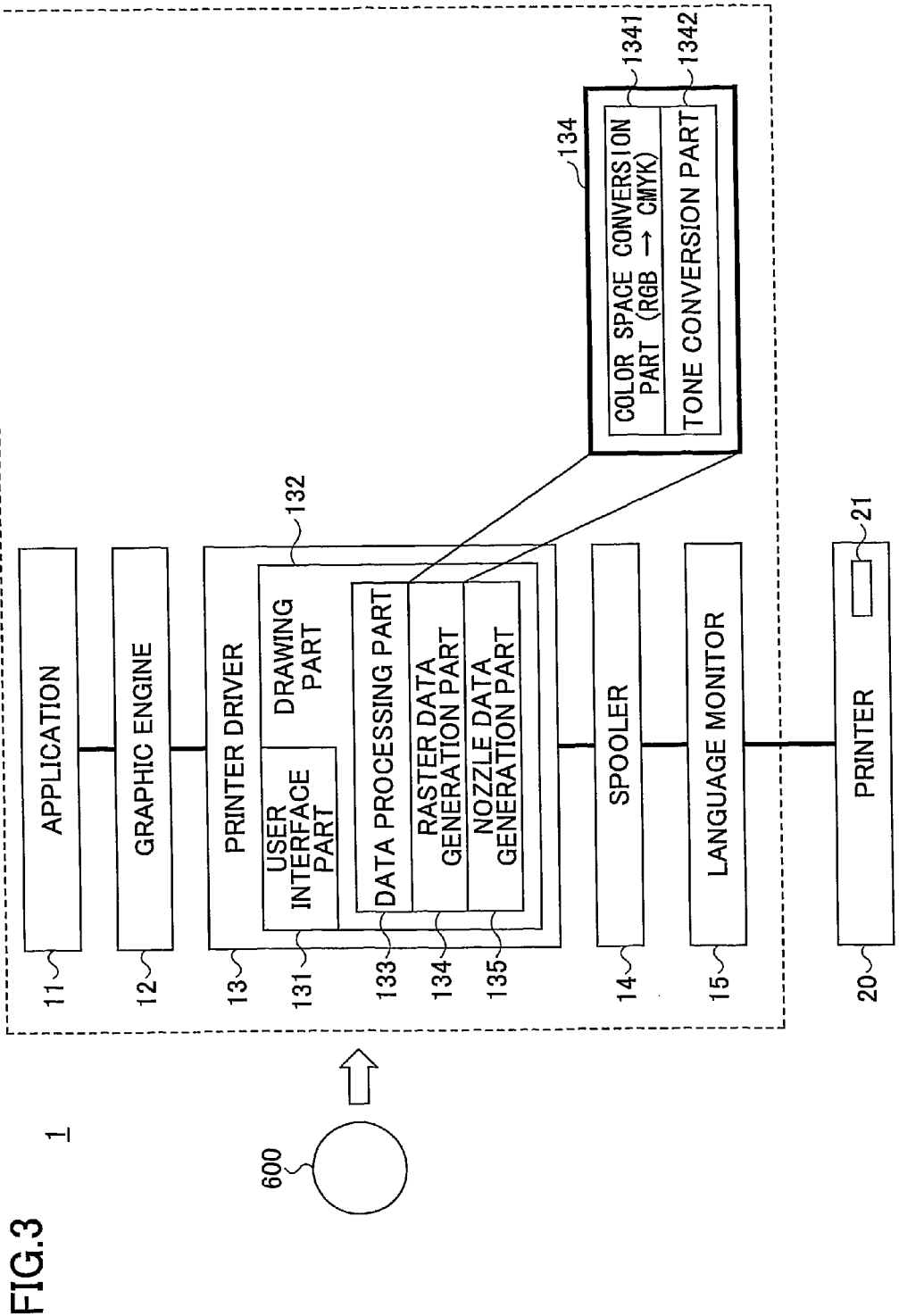
FIG. 3 is a block diagram showing a printing system according to a first embodiment of the present invention.

A description is given, with reference to the accompanying drawings, of embodiments of the present invention. FIG. 3 is a block diagram showing a printing system 1 according to a first embodiment of the present invention. Referring to FIG. 3, the printing system 1 includes a host computer 10 and a printer 20.

The host computer 10 is used in order for a user to generate document data and give an instruction to print the document data. The host computer 10 executes varieties of software on an operating system (OS) such as Windows (registered trademark). Referring to FIG. 3, the host computer 10 includes an application 11, a graphic engine 12, a printer driver 13, a spooler 14, and a language monitor 15 as functions related to printing of document data. These function by a CPU (not graphically illustrated) executing a program installed in the host computer 10. The program may be downloaded through a network or installed from a recording medium 600 such as a CD-ROM.

The application 11 may be word processing software or spreadsheet software used for generating information to be printed by the printer 20, such as document data. The graphic engine 12 is a module that provides the application 11 with a function interface for drawing (image creation) that has absorbed differences due to types of devices such as a printer and a display. In response to an instruction to print document data that are a target of operation, the application 11 calls the function of the graphic engine 12.

In response to the function call from the application 11, the graphic engine 12 converts the document data according to a format specific to the application 11 into data of a format independent of the application 11 and interpretable by the OS, such as data of EMF (Enhanced Meta File) format (hereinafter referred to as "drawing data"), and outputs the generated drawing data to the printer driver 13. For example, in the Windows (registered trademark) environment, a GDI (Graphic Device Interface) corresponds to the graphic engine 12.

The printer driver 13 includes a user interface part 131 and a drawing part 132. The user interface part 131 causes a printer property dialog to be displayed as a GUI (Graphical User Interface) for causing printing attributes (printing conditions such as combining, duplex printing, stapling, and punching) to be set (determined). The drawing part 132 includes a data processing part 133, a raster data generation part 134, and a nozzle data generation part 135. The drawing part 132 generates printing data for causing the printer 20 to print the document data in response to a DRAW (drawing) command from the OS based on the drawing data (for example, a call via a DDI (Device Driver Interface)).

The data processing part 133 converts a drawing object (such as a character, figure, or image) related to the DRAW command into raster data (image data) after subjecting the drawing object to coordinate transformation such as combining or rotation. The image data generated herein in units of drawing objects are RGB data (data whose color space is RGB).

The raster data generation part 134 includes a color space conversion part 1341 and a tone conversion part 1342. The raster data generation part 134 performs color space conversion from RGB to CMYK and tone conversion on the image data in units of drawing objects generated by the data processing part 133. Further, the raster data generation part 134 generates image data in units of pages or bands (hereinafter, collectively referred to as pages) by combining the image data processed in units of drawing objects.

The nozzle data generation part 135 converts the image data in units of pages generated by the raster data generation part 134 into data (nozzle data) containing a command for causing ink to be discharged from the nozzles of a nozzle head 21 of the printer 20. In the nozzle data, the order of arrangement of bits in the image data generated by the raster data generation part 134 is converted into an order of arrangement according to the arrangement of nozzles. In the first embodiment, these nozzle data are referred to as "printing data." The printing data generated by the nozzle data generation part 135 are temporarily stored in the spooler 14. The language monitor 15 transmits the printing data temporarily stored in the spooler 14 to the printer 20.

The printer 20 is a common ink-jet (or gel-jet) printer, and performs printing based on the printing data fed from the host computer 10. The printer 20 is connected to the host computer 10 through a cable such as an RS-232C cable or a USB cable or a network such as a LAN (Local Area Network). The printer 20 includes the nozzle head 21 for discharging ink.

Figure 4:
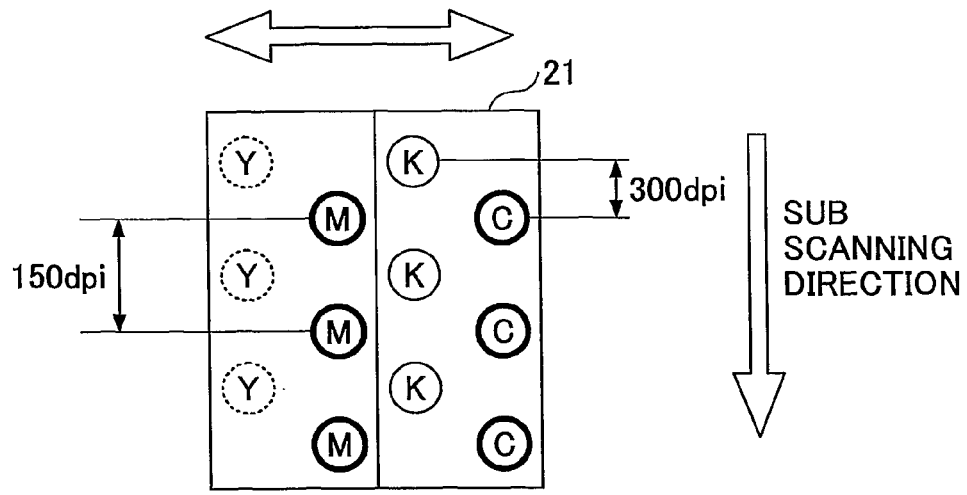
FIG. 4 is a diagram showing a nozzle arrangement in a nozzle head of a printer according to the first embodiment of the present invention.

FIG. 4 is a diagram showing a nozzle arrangement in the nozzle head 21 of the printer 20 according to this embodiment. In the nozzle head 21 of this embodiment, four nozzle arrays for different ink colors are arranged in order of Y (yellow), M (magenta), K (black), and C (cyan) in the main scanning direction, and the nozzles of each color have a resolution of 150 dpi in the sub scanning direction. In FIG. 4, the Y array and the K array coincide with each other in nozzle position in the sub scanning direction. Further, the nozzles of the M array and the C array are arranged in positions offset from the corresponding nozzles of the Y and K arrays by one dot in 300 dpi in the sub scanning direction. As a result, the nozzles are arranged in a staggered fashion as a whole. That is, according to this embodiment, the nozzles of K and the nozzles of Y form a first nozzle group, and the nozzle of M and the nozzles of C form a second nozzle group. Here, the term "nozzle group" refers to one or more nozzles. The printer 20 can express four tones or gradations (tone or gradation levels). That is, the amount of ink discharged from each nozzle of the nozzle head 21 on a dot-by-dot basis can be varied among four levels such as none (no ink discharge), a small droplet, a medium droplet, and a large droplet.

Next, an overview is given of the principle of the present invention. For example, according to the nozzle head 21 in which nozzles are arranged in a staggered manner as shown in FIG. 4, the resolution in the sub scanning direction is 150 dpi for each of the C, K, M, and Y colors. However, by simultaneously discharging inks from the nozzles of all the colors without taking color into consideration, it is possible to perform printing at 300 dpi with one movement (a single movement) of the nozzle head 21 in the main scanning direction (hereinafter, referred to as "single pass"). Using this principle, the printer 20 according to this embodiment achieves faster printing at the time of printing at resolutions higher than the resolution of the nozzle head 21 (150 dpi). However, when inks are discharged from all the nozzles, it is impossible to represent exact colors. Accordingly, this principle is applied only in the case of printing gray (including black) in this embodiment.

Figure 5:
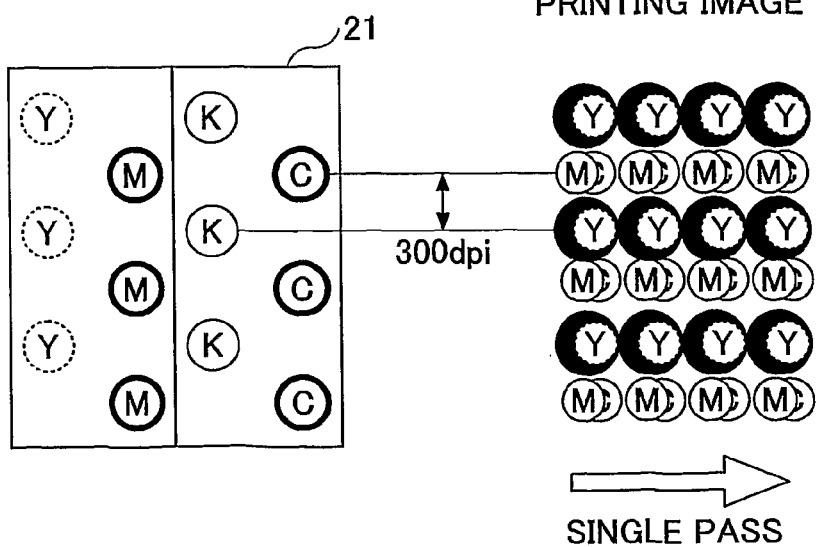
FIG. 5 is a diagram for illustrating the principle of the present invention.

FIG. 5 is a diagram for illustrating the principle of the present invention. FIG. 5 shows a printing image in the case where inks are discharged from the nozzles of all the colors of C, M, Y, and K in a single pass. As shown in FIG. 5, according to the nozzle arrangement of the nozzle head 21, inks are discharged so that K and Y are superposed and C and M are superposed. In order to represent gray as faithfully as possible, the tone level of Y may be "small droplet" or "none" and the tone level of each of C and M may be "medium droplet."

The dots where C and M are printed in FIG. 5 are conventionally where K should be printed by a second scan. However, according to this embodiment, gray is represented in a pseudo manner by printing C and M in order to print 300 dpi in a single pass. In this embodiment, C and M are selected as colors in which dots to represent gray in a pseudo manner are printed because C and M are colors darker than Y. Thus, although colors to be printed for dots where K is not printed are not necessarily limited to C and M, printing C and M is preferable to printing Y and C or Y and M in terms of reducing unnaturalness to human vision. The method of printing gray in a pseudo manner at high resolution by printing other colors one over the other for dots where K cannot be printed as shown in FIG. 5 is hereinafter referred to as "pseudo gray printing method."

Figure 6:
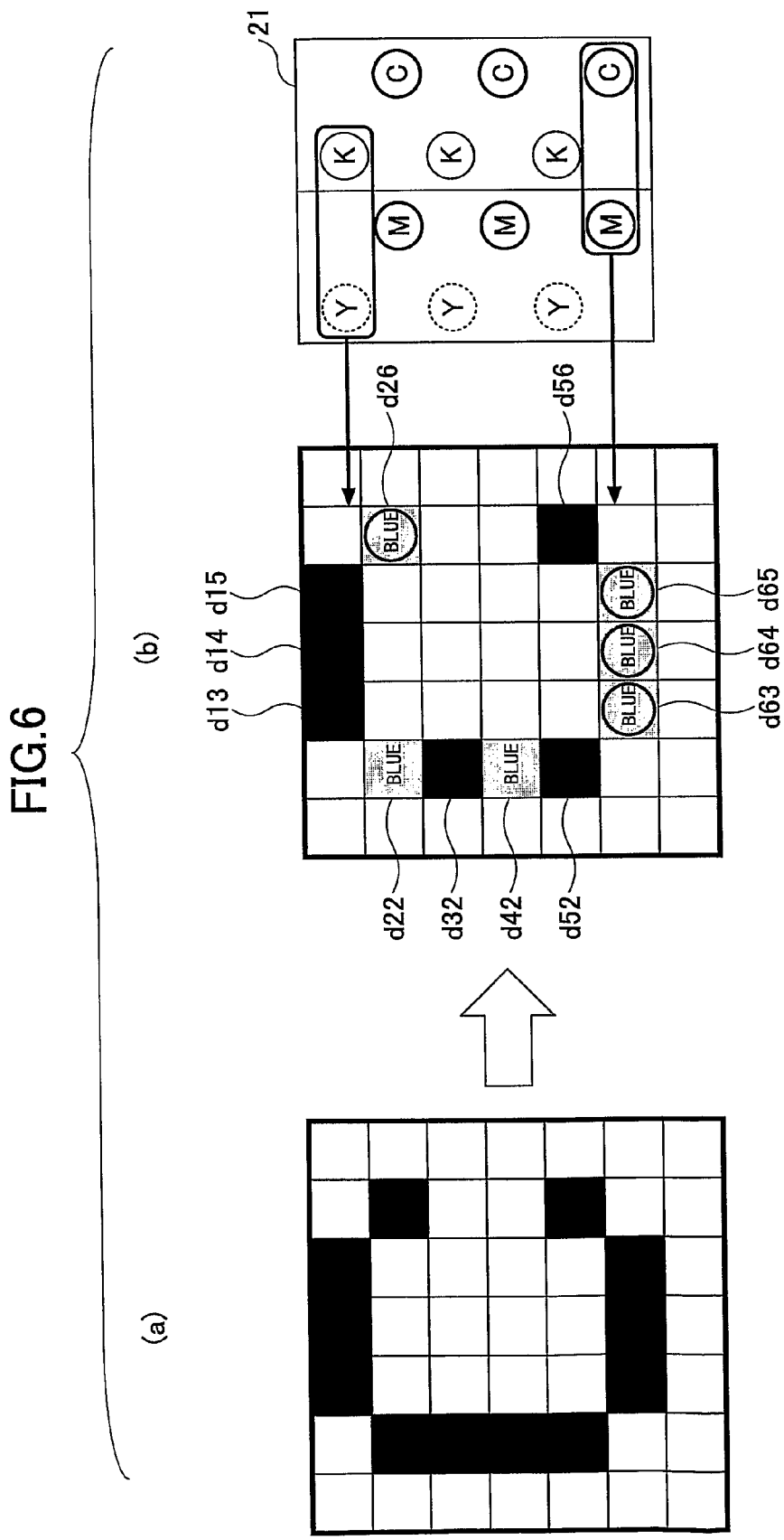
FIG. 6 is a diagram for illustrating the relationship between original data and printing results according to a pseudo gray printing method according to the first embodiment of the present invention.

FIG. 6 is a diagram for illustrating the relationship between original data and printing results according to the pseudo gray printing method. In FIG. 6, (a) shows the dot configuration of the image data (RGB data) of a gray character (letter) "C" contained in document data. Since the character "C" is gray, the R, G, and B values of each dot forming the character "C" have a relationship of R=G=B.

On the other hand, (b) shows a dot configuration and the color of each dot in the case where the character "C" is printed by the pseudo gray printing method. In (b) of FIG. 6, the nozzle 21 is also shown in order to show the relationship between each dot and a nozzle for printing ink for the dot.

In (b) of FIG. 6, with respect to dots d13, d14, d15, d32, d52, and d56, gray is appropriately printed because K is printed. However, with respect to other dots (dots d22, d26, d42, d63, d64, and d65), the colors of the dots themselves are blue or a color close to blue because M and C are printed. Gray can also be represented by a mixture of three colors of C, M, and Y (or four colors of C, M, Y, and K). Accordingly, discomfort that human vision experiences from the dots having multiple gray dots in the neighborhood (for example, the dots d22 and d42) is relatively limited. On the other hand, the dots having few gray dots in the neighborhood (for example, the dots d26, d63, d64, and d65), indicated by circles in (b) of FIG. 6, have a problem in that blue is relatively easily noticeable to human vision.

Figure 7:
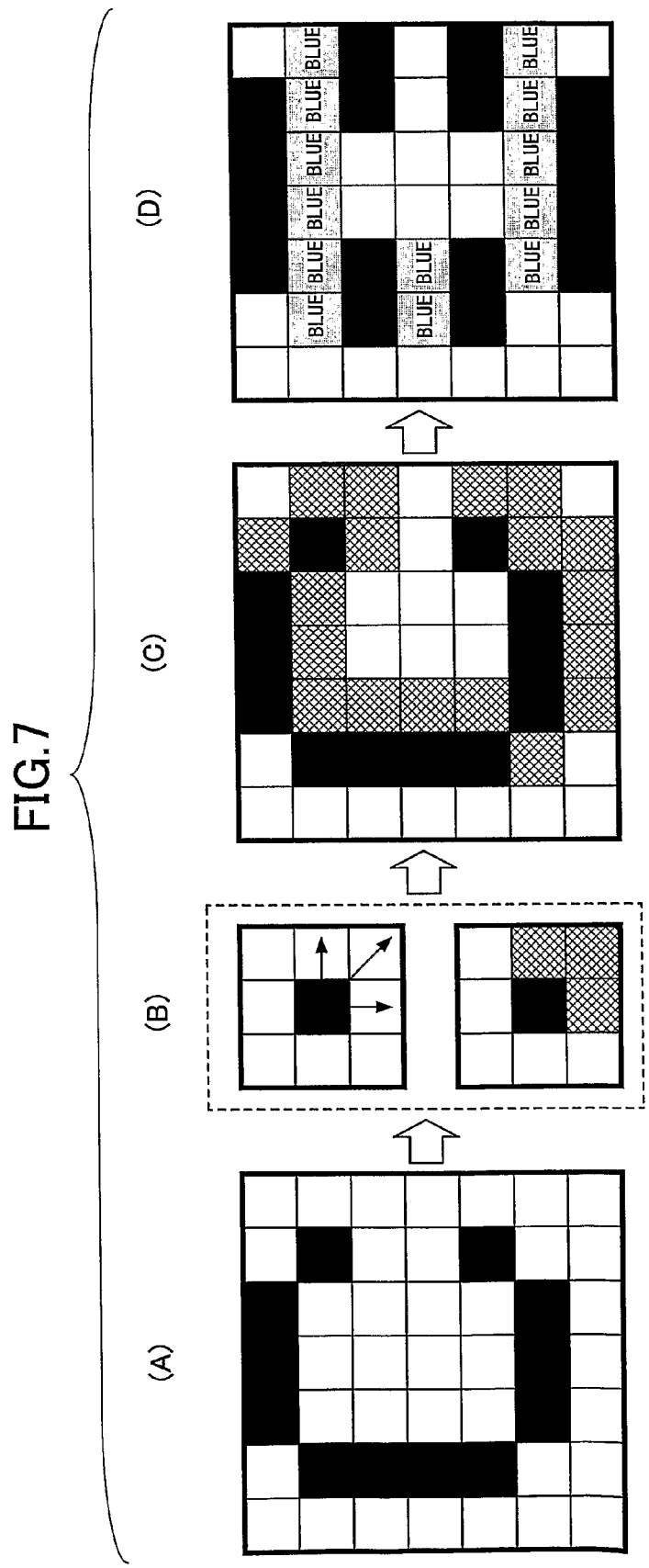
FIG. 7 is a diagram for illustrating a method for making a dot that represents gray in a pseudo manner less noticeable according to the first embodiment of the present invention.

Therefore, according to this embodiment, the following image processing is performed in order to make a blue dot that represents gray in a pseudo manner less noticeable. FIG. 7 is a diagram for illustrating a method for making a dot that represents gray in a pseudo manner less noticeable.

In FIG. 7, (a) shows the dot configuration of the image data of a gray character "C" contained in document data as in (a) of FIG. 6. According to this embodiment, conversion as shown in (b) of FIG. 7 is performed on each dot in (a) of FIG. 7. That is, (b) shows the case where a dot is extended by one dot in each of the rightward, right-lower, and downward direction. In FIG. 7, (c) shows the dot configuration of the image data obtained as a result of performing extension of the dot shown in (b) (hereinafter referred to as "dot extension")

on each dot of (a). Further, (d) of FIG. 7 shows a dot configuration and the color of each dot in the case where the image data shown in (c) are printed by the pseudo gray printing method. As a result of dot extension, dots where K is not printed as a result of printing can be adjacent to dots where K is printed, so that blue in the dots where K is not printed can be less noticeable. The method according to FIG. 7 can be an appropriate solution, considering the minuteness of each dot to human vision, and ink bleed. The dot extension is not limited to the form as (b) of FIG. 7. It is only necessary to extend a dot in at least one of the eight adjacent directions by at least one dot each. Further, for example, the dot may be extended in each of three directions by two or more dots instead of one dot. As a result of dot extension, the character "C" is printed in a line bolder than it should otherwise be. Considering the minuteness of a single dot, however, this also is less likely to cause much discomfort to human vision.

Figure 8:
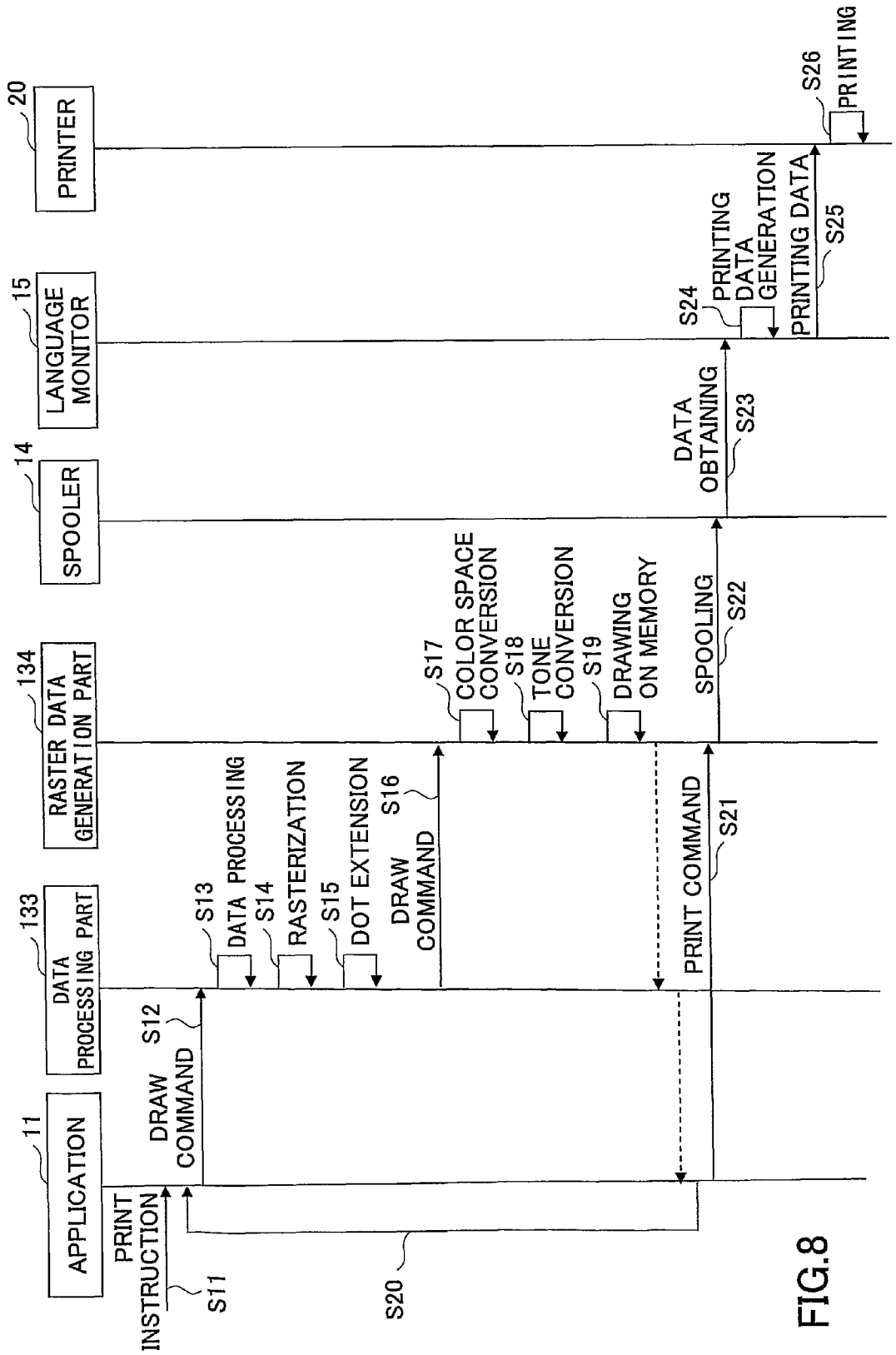
FIG. 8 is a sequence diagram for giving an overview of an operating procedure for printing in a host computer according to the first embodiment of the present invention.

A description is given below of an operating procedure executed in the host computer 10 in order to achieve what is described above with reference to FIGS. 5, 6, and 7. FIG. 8 is a sequence diagram for giving an overview of an operating procedure for printing in the host computer 10.

First, in step S11, a user gives an instruction to print document data determined as a target of editing in the application 11 through a menu of the application 11. At this point, in response to the user's instruction, the user interface part 131 of the printer driver 13 causes a printer property dialog to be displayed, and receives set printing attributes. According to this embodiment, it is assumed that it is possible to determine whether to perform printing according to the pseudo gray printing method in the printer property dialog. If printing by the pseudo gray printing method (hereinafter referred to as "pseudo gray mode") is selected, the drawing part 132 is notified that the pseudo gray mode is selected. In this case, the drawing part 132 turns ON a flag that indicates that the pseudo gray mode is selected.

Next, in step S12, a DRAW command to draw a single drawing object in the document data (hereinafter referred to as "current object") is input to the data processing part 133 of the printer driver 13. This DRAW command contains, for example, information for identifying the position and shape of the current object and the color information (R, G, and B values) of the current object. The information for identifying the shape of the current object contains a character code, font, and font size if the current object is a character. If the current object is a graphic, the information for identifying the shape of the current object contains coordinate values specifying the shape of the current object (the coordinate values of a start point and an end point in the case of a line segment). If the current object is image data, the image data are input together with the DRAW command.

Next, in step S13, the data processing part 133 performs processing (combining, enlargement, reduction, or rotation) according to the set printing attributes in the printer property dialog to execute coordinate transformation on the coordinate values regarding the current object. Next, in step S14, the data processing part 133 rasterizes the current object (converts the current object into raster data). Accordingly, if the current object is a character, image data representing the character (for example, the image data as shown in (a) of FIG. 7) are generated. The image data here have 8-bit tone levels with respect to each of R, G, and B (hereinafter referred to as "RGB(8)").

Next, in step S15, the data processing part 133 performs dot extension on each dot forming the rasterized current object (hereinafter referred to as "current RGB data") if the R, G, and B values of the current object are equal (R=G=B) (that is, if the color of the current object is gray (including black)). The dot extension is as described above with reference to FIG. 7. Next, in step S16, the data processing part 133 inputs a DRAW command for the current RGB data to the raster data generation part 134.

In step S17, the color space conversion part 1341 of the raster data generation part 134 converts the color space of the current RGB data from RGB(8) to CMYK(8) in response to the DRAW command from the data processing part 133. Here, the parenthesized numeric value of CMYK(8) indicates the number of bits of tone levels with respect to each of the planes of C, M, Y, and K. The converted data (data after the conversion) are hereinafter referred to as "current CMYK data."

Next, in step S18, the tone conversion part 1342 of the raster data generation part 134 converts, by dithering, the tone levels (8 bits) of the current CMYK data into tone levels (2 bits) expressible by the printer 20, and in step S19, draws the current CMYK data after the conversion on memory (for example, band memory). If the tone levels expressible by the printer 20 are 1 bit, the tone levels of the current CMYK data are converted into 1 bit.

Steps S12 through S19 described above are performed in units of pages or bands of the document data (step S20). Bands are units into which a page is divided by n in accordance with the capacity of the band memory. In this embodiment, it is assumed that steps S12 through S19 are performed in units of pages for convenience purposes. That is, the processing is repeated with respect to each drawing object contained in one page. If one page's worth of processing is completed, in step S21, a PRINT (printing) command is input to the raster data generation part 134.

In response to the input PRINT command, the raster data generation part 134 spools the image data of CMYK(2) (CMYK data) drawn on the memory into the spooler 14. In step S22, the language monitor 15 obtains the CMYK data from the spooler 14, and in step S23, converts the CMYK data into nozzle data (printing data). In step S24, the language monitor 15 transmits the printing data after the conversion to the printer 20. In step S25, in response to reception of the printing data, the printer 20 prints the document data based on the printing data.

Figure 9:
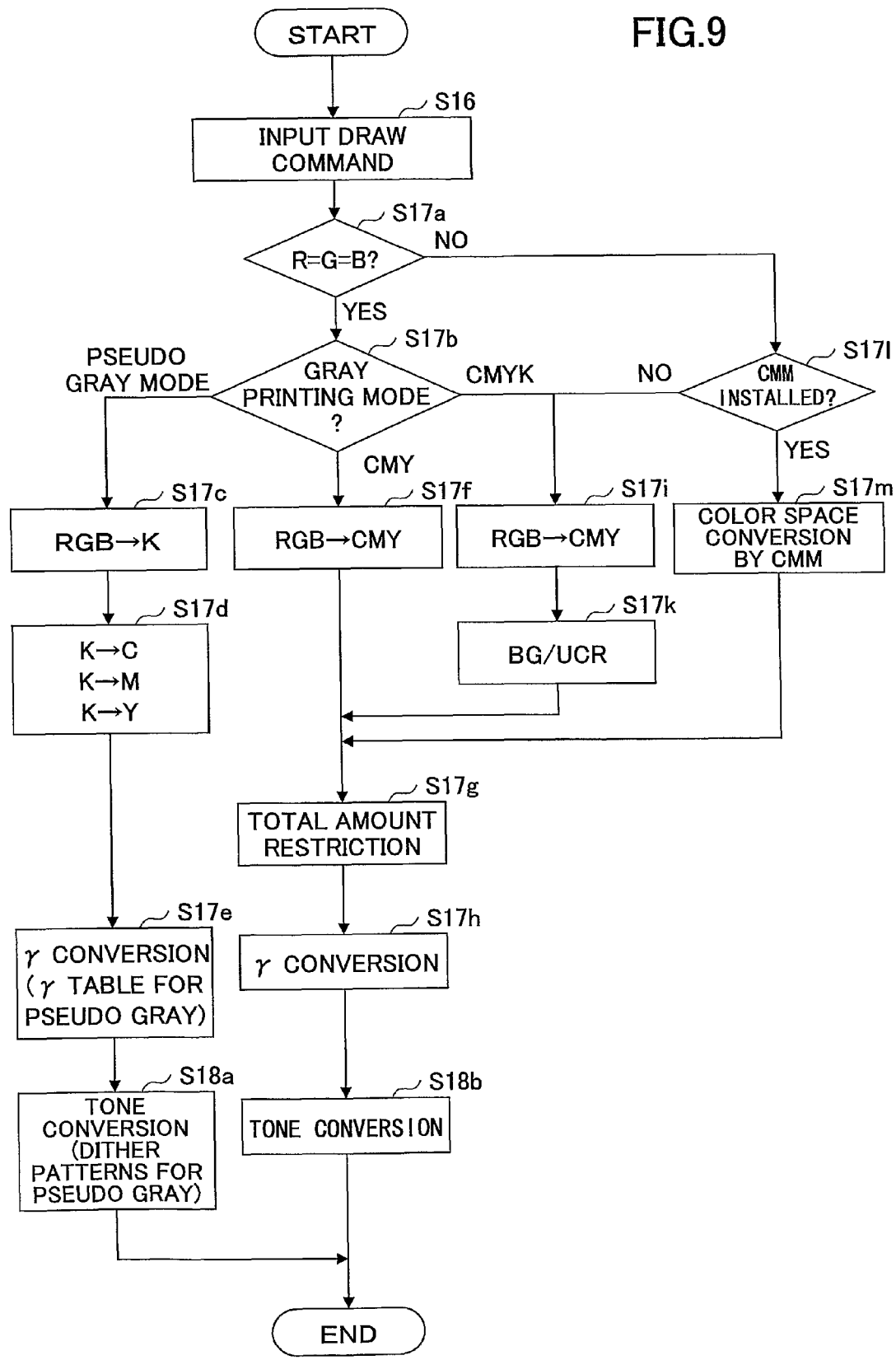
FIG. 9 is a flowchart for illustrating an operating procedure for image processing by a raster data generation part according to the first embodiment of the present invention.

Next, a description is given in more detail of the image processing by the raster data generation part 134 in FIG. 8. FIG. 9 is a flowchart for illustrating an operating procedure for the image processing by the raster data generation part 134. In FIG. 9, a description is given of steps S16 through S18 in FIG. 8.

When the DRAW command regarding the current RGB data is input from the data processing part 131 in step S16, in step S17*a*, the color space conversion part 1341 determines whether the R, G, and B values of the current RGB data are equal (R=G=B), that is, whether the color of the current RGB data is gray (including black). If the color of the current RGB data is gray (YES in step S17*a*), in step S17*b*, the color space conversion part 1341 determines the setting of a gray printing mode (a printing mode in the case of printing a gray drawing object). For example, the gray printing mode is preset by the printer property dialog. If the gray printing mode is the pseudo gray mode (that is, if the flag of the pseudo gray mode is ON), in step S17*c*, the color space conversion part 1341 first generates the current CMYK data so as to represent the gray of the current RGB data in a single color of K in CMYK space. In more detail, the color space conversion part 1341 carries out an operation of K=1.0−R (assigns the result of calculating 1.0−R to K). Next, in step S17*d*, the color space conversion part 1341 assigns the K value of the current CMYK data to each of C, M, and Y. This is because gray is represented in a pseudo manner using all the colors in the case of the pseudo gray mode as described with reference to FIG. 5. Next, in step S17e, the color space conversion part 1341 performs gamma (γ) conversion on the current CMYK data. At this point, the color space conversion part 1341 performs the gamma conversion using a gamma table for the pseudo gray mode. That is, various conversion tables (or conversion parameters) dedicated to the pseudo gray mode, such as the gamma table and dither masks used in the next step (S18a), are prepared.

Figure 10:
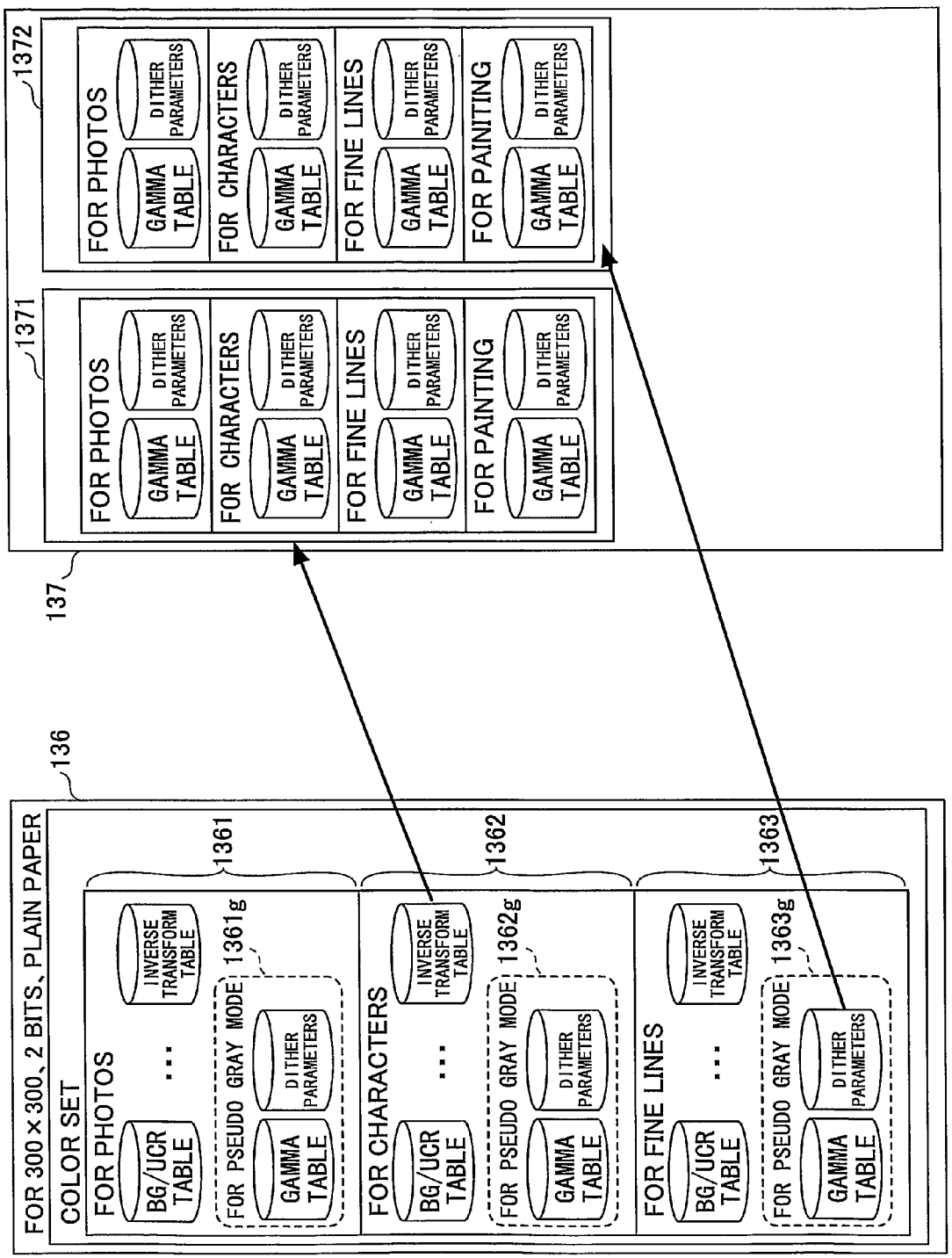
FIG. 10 is a diagram showing various conversion tables in a drawing part according to the first embodiment of the present invention.

FIG. 10 is a diagram showing various conversion tables in the drawing part 132. Referring to FIG. 10, a conversion file group 136 shows various conversion tables retained as files. Further, memory data 137 show various conversion tables loaded into memory.

The conversion file group 136 shown in FIG. 10 is for a resolution of 300×300 dpi, 2-bit tone levels, and plain paper. That is, various conversion file groups 136 are prepared according to resolution, tone level, and paper (paper type). Further, in the single conversion file group 136, conversion file groups are prepared according to (the types of) drawing objects contained in document data. In FIG. 10, a conversion file group for photographs 1361, a conversion file group for characters 1362, and a conversion file group for fine (thin) lines 1363 are shown as examples. Further, each of the conversion file groups according to drawing objects includes a conversion file group for the pseudo gray mode. In FIG. 10, a pseudo gray mode conversion file group for photographs 1361g, a pseudo gray mode conversion file group for characters 1362g, and a pseudo gray mode conversion file group for fine lines 1363g are shown.

Each conversion file contained in the conversion file group 136 is loaded into memory as the memory data 137 as required. FIG. 10 shows the case where gamma tables and dither masks are loaded as memory data 1371 for color and memory data 1372 for the pseudo gray mode, respectively. In the case of not being in the pseudo gray mode, the conversion tables for the pseudo gray mode are not loaded. Accordingly, application of the present invention has little effect on memory consumption at the time of conventional printing.

Next, in step S18a, the tone conversion part 1342 converts the tone levels of the current CMYK data into 2 bits (four tone levels) by dithering. At this point, the tone conversion part 1342 performs the tone conversion using dither masks corresponding to the current drawing object in the memory data 1372 for the pseudo gray mode of FIG. 10. The dither masks for the pseudo gray mode are configured as follows, for example.

Figure 11:
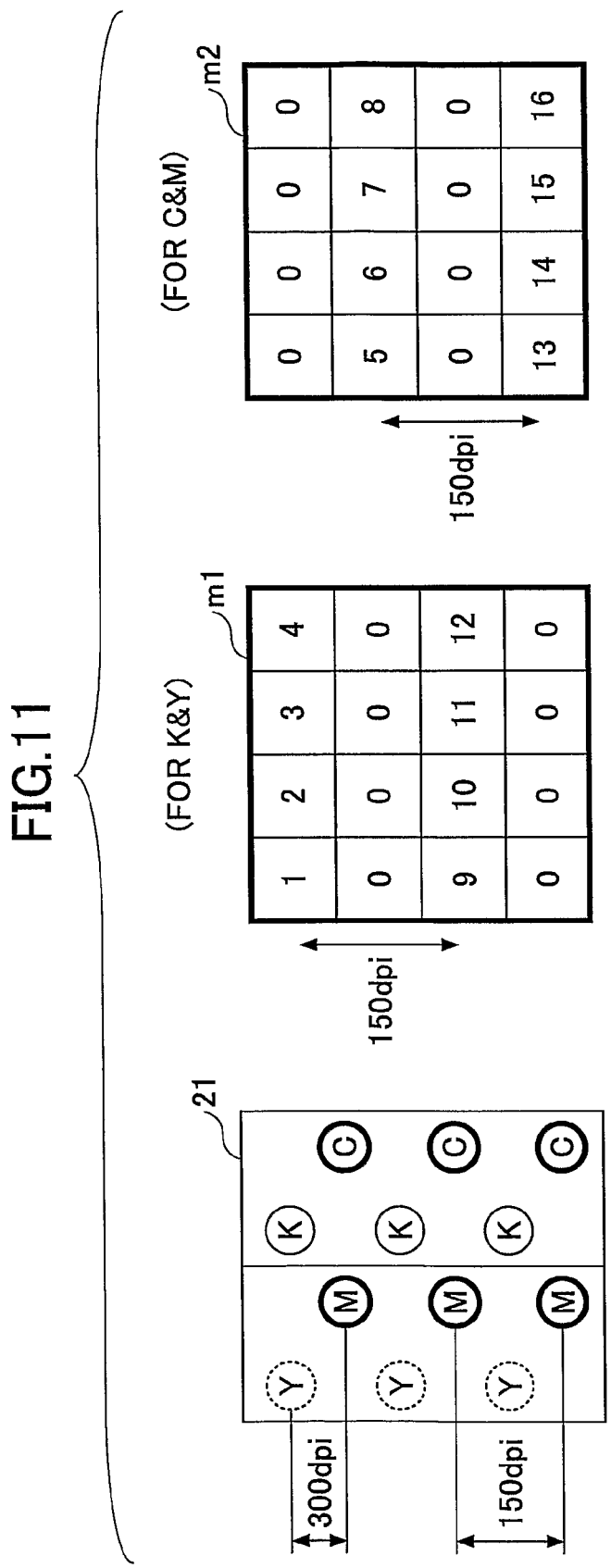
FIG. 11 is a diagram showing examples of dither masks for a pseudo gray mode according to the first embodiment of the present invention.

FIG. 11 is a diagram showing examples of dither masks for the pseudo gray mode. Referring to FIG. 11, a dither mask m1 is a generalization of dither masks for K and Y, and a dither mask m2 is a generalization of dither masks for C and M. The dither masks m1 and m2 are for 300×300 dpi. Further, in FIG. 11, the nozzle arrangement in the nozzle head 21 is shown to help understand the correspondence between the color nozzles and the dither masks.

In the dither masks m1 and m2 of FIG. 11, a value "0" shows that the tone of the dot is converted into 0 (which means that no ink is printed). For example, in the dither mask m1, "0" is added to the dots other than those where K and Y are printed (that is, the dots corresponding to the C nozzles and the M nozzles). On the other hand, in the dither mask m2, "0" is added to the dots other than those where C and M are printed (that is, the dots corresponding to the K nozzles and the Y nozzles). Values other than 0 show that the tone of the dot is converted into other than 0. However, the values themselves have no particular meanings. In FIG. 11, the values other than "0" indicate the positions of the corresponding dots in the dither masks m1 and m2 for convenience purposes.

That is, by performing tone conversion on the K and Y planes with the dither mask m1, the tone values of K and Y are 0 with respect to the dots at positions where K and Y cannot be printed in a single pass. Accordingly, it is possible to exclude K and Y color components from those dots. On the other hand, by performing tone conversion on the C and M planes with the dither mask m2, the tone values of C and M are 0 with respect to the dots at positions where C and M cannot be printed in a single pass. Accordingly, it is possible to exclude C and M color components from those dots. Accordingly, by performing tone conversion using the dither mask m1 and the dither mask m2, it is possible to generate such CMYK data as to enable the printer 20 to print a gray drawing object of 300 dpi in the sub scanning direction in a single pass in the pseudo gray. That is, based on printing data generated based on such CMYK data, the nozzle head 21 of the printer 20 may print C and M and is not required to print K (in a second pass) with respect to dots where K cannot be printed in a single pass. The dither masks of K and Y may not be the same if the dither masks have in common that the tone value is converted into 0 with respect to the dots at positions where K and Y cannot be printed in a single pass. The same applies to the dither masks of C and M. Further, Y ink does not always have to be printed in printing gray. Accordingly, the dither mask of Y in the pseudo gray mode may be one where all dots are "0." In this case, only K is printed with respect to dots for which K and Y can be printed.

On the other hand, if the gray printing mode is other than the pseudo gray mode in step S17b ("CMY" or "CMYK" in step S17b), or if the color of the current RGB data is not gray in the first place (NO in step S17a), general image processing is performed. For example, if the gray printing mode is a CMY mode (expressing colors with three colors of C, M, and Y) ("CMY" in step S17b), in step S17f, the color space conversion part 1341 converts the color space of the current RGB data into CMY(8). Then, the color space conversion part performs total amount restriction processing in step S17g, and performs gamma conversion in step S17h. The total amount restriction processing is for restricting the amounts of C, M, Y, and K inks in order to prevent large amounts of inks from being printed for one dot. Next, in step S18b, the tone conversion part 1342 performs tone conversion on the current CMYK data.

Further, if the gray printing mode is a CMYK mode (expressing colors with four colors of C, M, Y, and K) ("CMYK" in step S17b), in step S17i, the color space conversion part 1341 converts the color space of the current RGB data into CMY(8). Further, in step S17k, the color space conversion part 1341 generates black data and converts the CMY data into CMYK data by performing black generation and under color removal (BG/UCR). Thereafter, the above-described processing of steps S17g through S18b is performed.

Further, if the color of the current RGB data is not gray (NO in step S17a), in step S17l, it is determined whether a CMM (Color Management Module) is installed in the host computer 10. If the CMM is installed in the host computer 10 (YES in step S17l), in step S17m, the CMM performs color space conversion from RGB to CMYK(8) with respect to the current RGB data. Thereafter, the processing of steps S17g through S18b is performed. On the other hand, if the CMM is not installed (NO in step S17l), the above-described processing of steps S17i through S18b is performed.

As described above, according to the host computer 10 (printer driver 13) of the first embodiment, in the case of printing a gray drawing object at a resolution higher than (for example, twice) the resolution of the nozzle head 21 in the sub scanning direction, image processing is performed so that K is not applied but colors related to nozzles offset in the sub scanning direction from the nozzles related to K in the nozzle head 21 (C and M in this embodiment) are applied to dots for which K ink cannot be printed in a single movement of the nozzle head 21 in the main scanning direction.

Accordingly, it is possible to cause the printer 20 to perform printing at the higher resolution in a single pass and to perform printing capable of reducing unnaturalness of colors. Accordingly, it is possible to increase printing speed with respect to printing of a gray drawing object.

Further, image processing is performed using replaceable dither masks so that K is not applied but colors related to nozzles offset in the sub scanning direction from the nozzles related to K in the nozzle head 21 (C and M in this embodiment) are applied to dots for which K ink cannot be printed in a single movement of the nozzle head 21 in the main scanning direction.

Accordingly, if printing destination printers are different, it is possible to easily support each printer by changing dither masks in accordance with the printer without changing the program logic of the printer driver 13.

Further, dot extension is performed on a gray dot. Accordingly, it is possible to further reduce the unnaturalness of the color of a dot where gray is represented in a pseudo manner (a dot where K is not printed).

It is preferable that printing by the pseudo gray mode be selectable by a user in a printer property dialog as in this embodiment. As a result, even if the pseudo gray is somewhat unnatural, the user can be more convinced of the printing result because some unnaturalness of the color is the result of the user selecting the pseudo gray mode at her/his discretion.

Next, a description is given of a second embodiment of the present invention. FIG. 12 is a diagram showing a printing system 2 according to the second embodiment. In FIG. 12, the same elements as those of FIG. 3 are referred to by the same reference numerals, and a description thereof is omitted.

According to the printing system 2 of FIG. 12, the raster data generation part 134 and the nozzle data generation part 135 included in the drawing part 132 of the printer driver 13 in the first embodiment (FIG. 3) are implemented as a raster data generation part 22 and a nozzle data generation part 23, respectively, in the printer 20. That is, the second embodiment is different from the first embodiment in that the processing by the raster data generation part 134 and the processing by the nozzle data generation part 135 are performed by the raster data generation part 22 (including a color space conversion part 221 and a tone conversion part 222) and the nozzle data generation part 23, respectively, in the printer 20. Otherwise, the second embodiment is the same as the first embodiment. That is, the image processing described above with reference to FIG. 9 may be performed in the printer 20.

According to one embodiment of the present invention, there is provided an image processing apparatus (10) including an image processing part (13) configured to perform image processing for causing a printer (20) to print document data, the printer (20) having a nozzle head (21), the nozzle head (21) having a first nozzle group and a second nozzle group, the first nozzle group having multiple nozzles of K and multiple nozzles whose positions coincide with positions of the nozzles of the K in a sub scanning direction, the second nozzle group having multiple nozzles offset in the sub scanning direction from the nozzles of the K, wherein the image processing part (13) is configured to perform the image processing so that the K is prevented from being applied to and one or more colors related to the second nozzle group are applied to multiple dots corresponding to the second nozzle group in a single movement of the nozzle head in a main scanning direction with respect to a gray drawing object contained in the document data.

According to one embodiment of the present invention, there is provided a printer (20) including a nozzle head (21) configured to have a first nozzle group and a second nozzle group, the first nozzle group having multiple nozzles of K and multiple nozzles whose positions coincide with positions of the nozzles of the K in a sub scanning direction, the second nozzle group having multiple nozzles offset in the sub scanning direction from the nozzles of the K; and an image processing part (22) configured to perform image processing for causing document data to be printed, wherein the image processing part (22) is configured to perform the image processing so that the K is prevented from being applied to and one or more colors related to the second nozzle group are applied to multiple dots corresponding to the second nozzle group in a single movement of the nozzle head in a main scanning direction with respect to a gray drawing object contained in the document data.

According to one embodiment of the present invention, there is provided a method of performing image processing for causing a printer (20) to print document data, the printer having a nozzle head (21), the nozzle head (21) having a first nozzle group and a second nozzle group, the first nozzle group having multiple nozzles of K and multiple nozzles whose positions coincide with positions of the nozzles of the K in a sub scanning direction, the second nozzle group having multiple nozzles offset in the sub scanning direction from the nozzles of the K, the method including the step of performing the image processing so that the K is prevented from being applied to and one or more colors related to the second nozzle group are applied to multiple dots corresponding to the second nozzle group in a single movement of the nozzle head in a main scanning direction with respect to a gray drawing object contained in the document data.

According to one embodiment of the present invention, there is provided an image processing program for causing a computer to execute image processing for causing a printer (20) to print document data, the printer (20) having a nozzle head (21), the nozzle head (21) having a first nozzle group and a second nozzle group, the first nozzle group having multiple nozzles of K and multiple nozzles whose positions coincide with positions of the nozzles of the K in a sub scanning direction, the second nozzle group having multiple nozzles offset in the sub scanning direction from the nozzles of the K, wherein the image processing program includes the step of performing the image processing so that the K is prevented from being applied to and one or more colors related to the second nozzle group are applied to multiple dots corresponding to the second nozzle group in a single movement of the nozzle head in a main scanning direction with respect to a gray drawing object contained in the document data.

According to one embodiment of the present invention, there is provided a computer-readable recording medium (600) having the image processing program recorded thereon.

Thus, according to embodiments of the present invention, it is possible to provide an image processing apparatus, a printer, an image processing method, and an image processing program capable of providing a new variation with respect to the balance of image quality and printing speed, and a computer-readable recording medium having the image processing program recorded thereon.

The present invention is not limited to the specifically disclosed embodiments, and variations and modifications may be made without departing from the scope of the present invention.

The present application is based on Japanese Priority Patent Applications No. 2006-178291, filed on Jun. 28, 2006, and No. 2007-147354, filed on Jun. 1, 2007, the entire contents of which are hereby incorporated by reference.

The invention claimed is:

1. An image processing apparatus, comprising:
an image processing part configured to perform image processing for causing a printer to print document data, the printer having a nozzle head, the nozzle head having a first nozzle group and a second nozzle group, the first nozzle group having a plurality of nozzles of K and a plurality of nozzles whose positions coincide with positions of the nozzles of the K in a sub scanning direction, the second nozzle group having a plurality of nozzles offset in the sub scanning direction from the nozzles of the K,
wherein the image processing part is configured to perform the image processing so that the K is prevented from being applied to and one or more colors related to the second nozzle group are applied to a plurality of dots corresponding to the second nozzle group in a single movement of the nozzle head in a main scanning direction with respect to a gray drawing object contained in the document data; and
the image processing part includes
an RGB data generation part configured to generate RGB data with respect to one or more drawing objects contained in the document data, and to extend each dot of the gray drawing object with respect to the RGB data on the gray drawing object.

2. The image processing apparatus as claimed in claim 1, wherein the image processing part comprises:
a CMYK data generation part configured to generate CMYK data with respect to the one or more drawing objects contained in the document data, and with respect to the gray drawing object, generate the CMYK data in which at least the K and the colors related to the second nozzle group are applied to the dots of the gray drawing object; and
a tone conversion part configured to perform tone conversion on one or more colors related to the first nozzle group including the K in the CMYK data using a first dither mask causing tone values of the dots corresponding to the second nozzle group to be 0, and on the colors related to the second nozzle group in the CMYK data using a second dither mask causing dots corresponding to the first nozzle group to be 0, in the single movement of the nozzle head in the main scanning direction.

3. The image processing apparatus as claimed in claim 2, wherein the CMYK data generation part comprises:
a color conversion part configured to convert the RGB data in which each of the dots of the gray drawing object is extended into the CMYK data.

4. A method of performing image processing for causing a printer to print document data, the printer having a nozzle head, the nozzle head having a first nozzle group and a second nozzle group, the first nozzle group having a plurality of nozzles of K and a plurality of nozzles whose positions coincide with positions of the nozzles of the K in a sub scanning direction, the second nozzle group having a plurality of nozzles offset in the sub scanning direction from the nozzles of the K, the method comprising:
performing the image processing so that the K is prevented from being applied to and one or more colors related to the second nozzle group are applied to, a plurality of dots corresponding to the second nozzle group in a single movement of the nozzle head in a main scanning direction with respect to a gray drawing object contained in the document data and
generating RGB data with respect to one or more drawing objects contained in the document data, and extending each dot of the gray drawing object with respect to the RGB data on the gray drawing object.

5. The method as claimed in claim 4, wherein the step of performing the image processing comprises:
generating CMYK data with respect to the one or more drawing objects contained in the document data, and with respect to the gray drawing object, generating the CMYK data in which at least the K and the colors related to the second nozzle group are applied to the dots of the gray drawing object; and
performing tone conversion on one or more colors related to the first nozzle group including the K in the CMYK data using a first dither mask causing tone values of the dots corresponding to the second nozzle group to be 0, and on the colors related to the second nozzle group in the CMYK data using a second dither mask causing dots corresponding to the first nozzle group to be 0, in the single movement of the nozzle head in the main scanning direction.

6. The method as claimed in claim 5, wherein the step of generating the CMYK data comprises:
converting the RGB data in which each of the dots of the gray drawing object is extended into the CMYK data.

7. A non-transitory computer-readable recording medium on which is recorded an image processing program for causing a computer to execute image processing for causing a printer to print document data, the printer having a nozzle head, the nozzle head having a first nozzle group and a second nozzle group, the first nozzle group having a plurality of nozzles of K and a plurality of nozzles whose positions coincide with positions of the nozzles of the K in a sub scanning direction, the second nozzle group having a plurality of nozzles offset in the sub scanning direction from the nozzles of the K, wherein the image processing program causes the computer to perform the steps of:
performing the image processing so that the K is prevented from being applied to, and one or more colors related to the second nozzle group are applied to, a plurality of dots corresponding to the second nozzle group in a single movement of the nozzle head in a main scanning direction with respect to a gray drawing object contained in the document data; and
generating RGB data with respect to one or more drawing objects contained in the document data, and extending each dot of the gray drawing object with respect to the RGB data on the gray drawing object.

* * * * *